Figure 3:
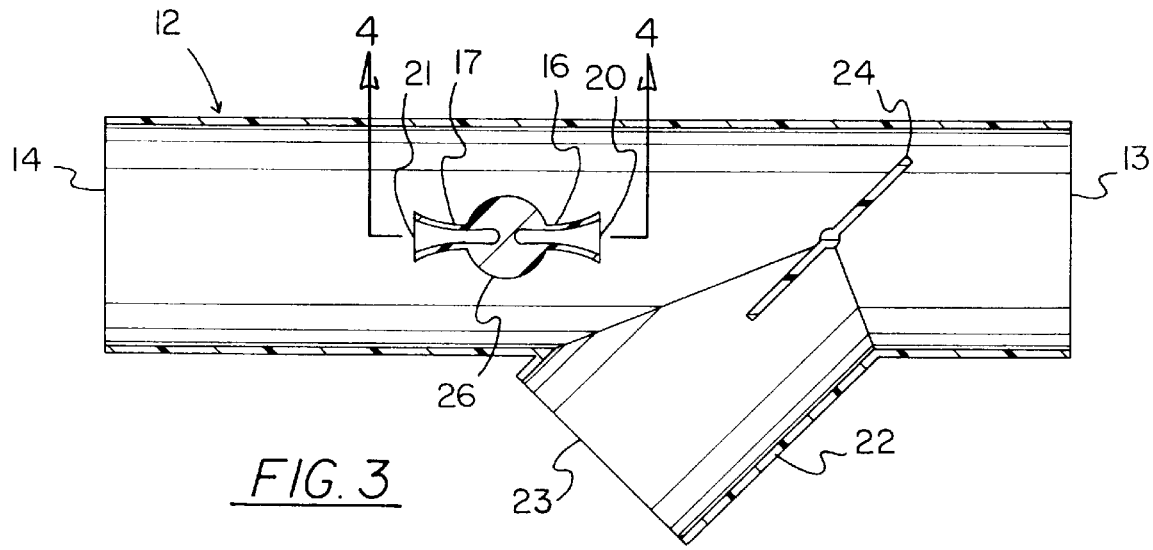
Figure 4:
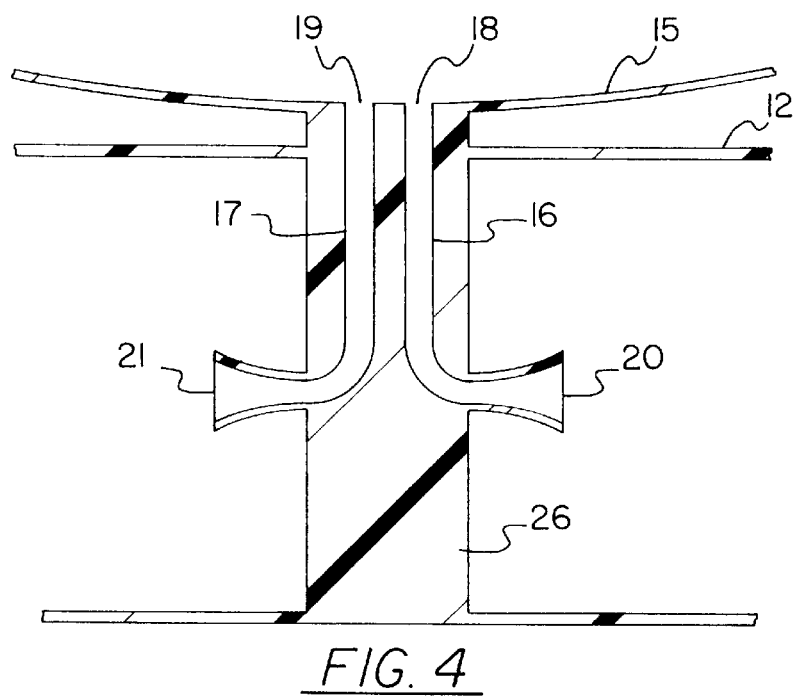

United States Patent
Hampton

[19]

[11] Patent Number: 5,964,420
[45] Date of Patent: Oct. 12, 1999

[54] PARTICULATE APPLICATOR ATTACHMENT FOR A LEAF BLOWER

[76] Inventor: Tracy E. Hampton, 901 South Broad St., Albertville, Ala. 35950

[21] Appl. No.: 09/070,650

[22] Filed: Apr. 30, 1998

[51] Int. Cl.⁶ .............................. B05B 15/00; B05B 7/30
[52] U.S. Cl. ..................... 239/654; 239/142; 239/143; 239/289; 239/346; 239/347; 239/365; 239/366; 239/663; 222/195; 222/630; 222/637; 406/136; 406/142; 406/141; 406/146
[58] Field of Search ....................... 239/289, 142, 239/143, 346, 347, 365, 366, 654, 663; 222/195, 630, 637; 406/134, 136, 139, 141, 142, 146, 153

[56] References Cited

U.S. PATENT DOCUMENTS

| | | | |
|---|---|---|---|
| 1,406,903 | 2/1922 | Rose | 222/195 X |
| 2,610,433 | 9/1952 | Chisholm et al. | 239/365 X |
| 2,675,147 | 4/1954 | Odom | 222/193 |
| 2,792,151 | 5/1957 | Wagner | 239/654 |
| 4,256,241 | 3/1981 | Mesic | 222/630 X |
| 4,474,327 | 10/1984 | Mattson et al. | 239/143 |
| 5,226,567 | 7/1993 | Sansalone | 222/195 |
| 5,429,278 | 7/1995 | Sansalone | 222/195 |

*Primary Examiner*—Andres Kashnikow
*Assistant Examiner*—Robin O. Evans

[57] ABSTRACT

A new particulate applicator attachment for a leaf blower for applying particulates such as powdered pesticides to a lawn or garden. The inventive device includes an elongate main tube having opposite intake and discharge ends. Each of the ends of the main tube has an opening into the lumen of the main tube. The intake end of the main tube is adapted for attachment to a blower tube of a leaf blower such that the lumen of the main tube is in fluid communication with the blower tube. A container for holding particulates is coupled to the main tube. Provided in the lumen of the main tube are intake and outlet conduits. One end of each of the conduits is connected to the container such that the lumen of the main tube is in fluid communication with the interior of the container through the conduits.

6 Claims, 2 Drawing Sheets

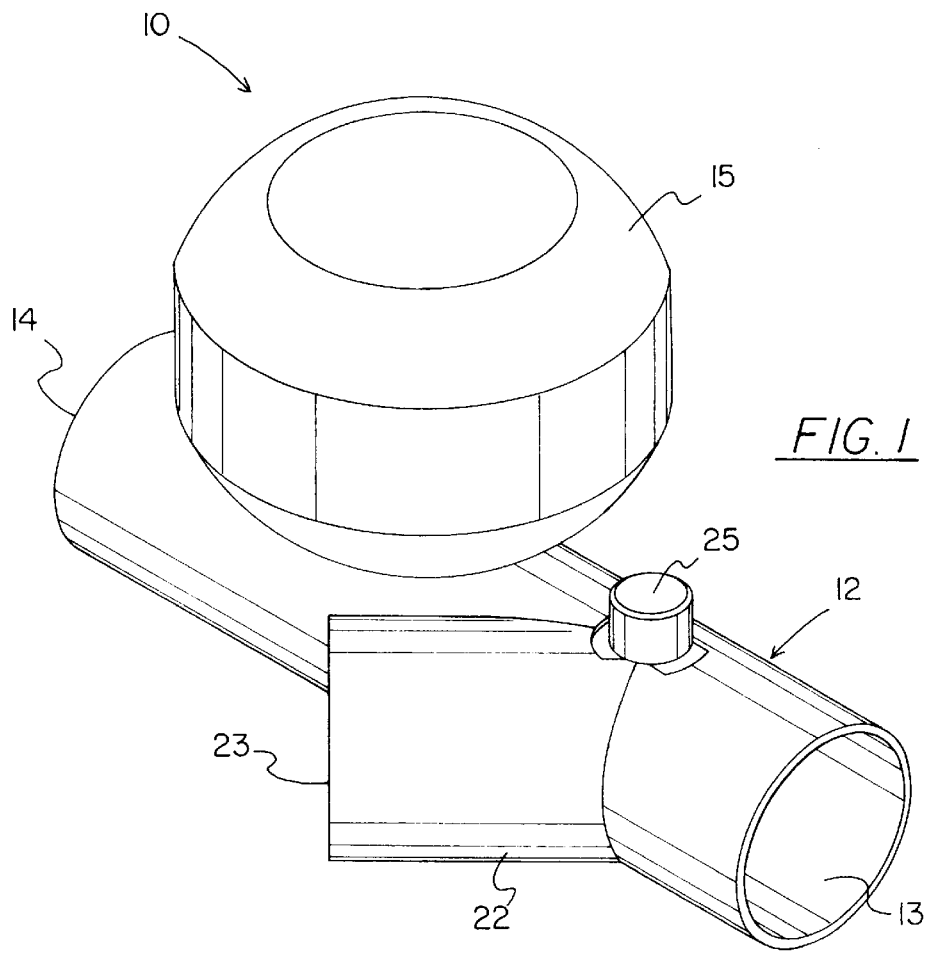
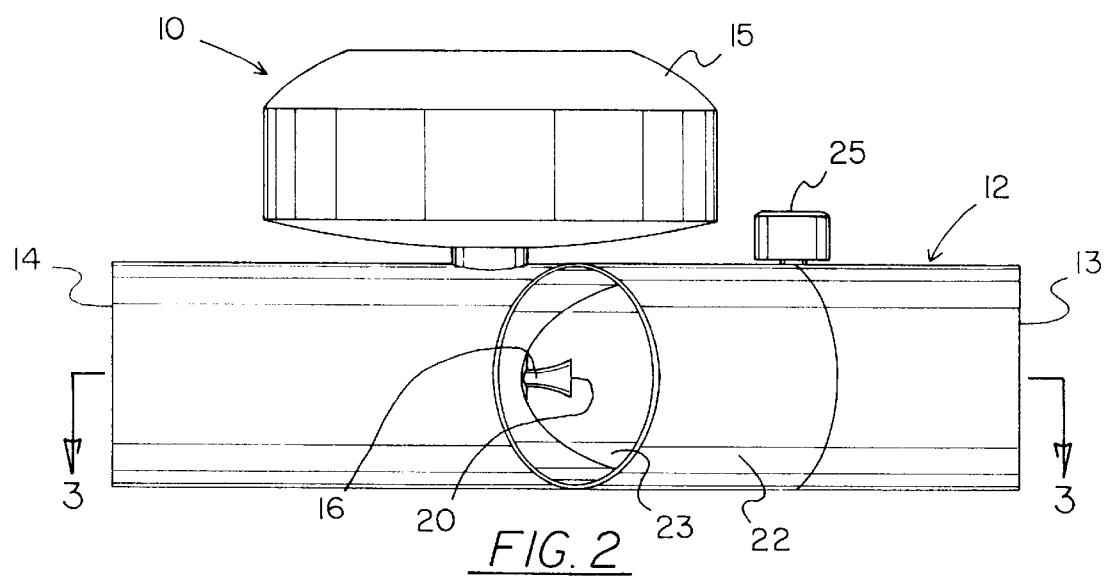

5,964,420

PARTICULATE APPLICATOR ATTACHMENT FOR A LEAF BLOWER

BACKGROUND OF THE INVENTION

1. Field of the Invention

The present invention relates to gardening accessories and more particularly pertains to a new particulate applicator attachment for a leaf blower for applying particulates such as powdered pesticides to a lawn or garden.

2. Description of the Prior Art

The use of gardening accessories is known in the prior art. More specifically, gardening accessories heretofore devised and utilized are known to consist basically of familiar, expected and obvious structural configurations, notwithstanding the myriad of designs encompassed by the crowded prior art which have been developed for the fulfillment of countless objectives and requirements.

Known prior art gardening accessories include U.S. Pat. Nos. 5,429,278; 5,226,567; 4,644,606; 4,474,327; 4,867,341; and U.S. Pat. No. Des. 353,822.

While these devices fulfill their respective, particular objectives and requirements, the aforementioned patents do not disclose a new particulate applicator attachment for a leaf blower. The inventive device includes an elongate main tube having opposite intake and discharge ends. Each of the ends of the main tube has an opening into the lumen of the main tube. The intake end of the main tube is adapted for attachment to a blower tube of a leaf blower such that the lumen of the main tube is in fluid communication with the blower tube. A container for holding particulates is coupled to the main tube. Provided in the lumen of the main tube are intake and outlet conduits. One end of each of the conduits is connected to the container such that the lumen of the main tube is in fluid communication with the interior of the container through the conduits.

In these respects, the particulate applicator attachment for a leaf blower according to the present invention substantially departs from the conventional concepts and designs of the prior art, and in so doing provides an apparatus primarily developed for the purpose of applying particulates such as powdered pesticides to a lawn or garden.

SUMMARY OF THE INVENTION

In view of the foregoing disadvantages inherent in the known types of gardening accessories now present in the prior art, the present invention provides a new particulate applicator attachment for a leaf blower construction wherein the same can be utilized for applying particulates such as powdered pesticides to a lawn or garden.

The general purpose of the present invention, which will be described subsequently in greater detail, is to provide a new particulate applicator attachment for a leaf blower apparatus and method which has many of the advantages of the gardening accessories mentioned heretofore and many novel features that result in a new particulate applicator attachment for a leaf blower which is not anticipated, rendered obvious, suggested, or even implied by any of the prior art gardening accessories, either alone or in any combination thereof.

To attain this, the present invention generally comprises an elongate main tube having opposite intake and discharge ends. Each of the ends of the main tube has an opening into the lumen of the main tube. The intake end of the main tube is adapted for attachment to a blower tube of a leaf blower such that the lumen of the main tube is in fluid communication with the blower tube. A container for holding particulates is coupled to the main tube. Provided in the lumen of the main tube are intake and outlet conduits. One end of each of the conduits is connected to the container such that the lumen of the main tube is in fluid communication with the interior of the container through the conduits.

There has thus been outlined, rather broadly, the more important features of the invention in order that the detailed description thereof that follows may be better understood, and in order that the present contribution to the art may be better appreciated. There are additional features of the invention that ill be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new particulate applicator attachment for a leaf blower apparatus and method which has many of the advantages of the gardening accessories mentioned heretofore and many novel features that result in a new particulate applicator attachment for a leaf blower which is not anticipated, rendered obvious, suggested, or even implied by any of the prior art gardening accessories, either alone or in any combination thereof.

It is another object of the present invention to provide a new particulate applicator attachment for a leaf blower which may be easily and efficiently manufactured and marketed.

It is a further object of the present invention to provide a new particulate applicator attachment for a leaf blower which is of a durable and reliable construction.

An even further object of the present invention is to provide a new particulate applicator attachment for a leaf blower which is susceptible of a low cost of manufacture with regard to both materials and labor, and which accordingly is then susceptible of low prices of sale to the consuming public, thereby making such particulate applicator attachment for a leaf blower economically available to the buying public.

Still yet another object of the present invention is to provide a new particulate applicator attachment for a leaf blower which provides in the apparatuses and methods of the prior art some of the advantages thereof, while simultaneously overcoming some of the disadvantages normally associated therewith.

Still another object of the present invention is to provide a new particulate applicator attachment for a leaf blower for applying articulates such as powdered pesticides to a lawn or garden.

Yet another object of the present invention is to provide a new particulate applicator attachment for a leaf blower which includes an elongate main tube having opposite intake and discharge ends. Each of the ends of the main tube has an opening into the lumen of the main tube. The intake end of the main tube is adapted for attachment to a blower tube of a leaf blower such that the lumen of the main tube is in fluid communication with the blower tube. A container for holding particulates is coupled to the main tube. Provided in the lumen of the main tube are intake and outlet conduits. One end of each of the conduits is connected to the container such that the lumen of the main tube is in fluid communication with the interior of the container through the conduits.

Still yet another object of the present invention is to provide a new particulate applicator attachment for a leaf blower that mounts to the blower tube of a leaf blower so that air blown out of the blower tube passes into the attachment so that particulates may be mixed with the air to permit spraying of the particulates over an area.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic perspective view of a new particulate applicator attachment for a leaf blower according to the present invention.

FIG. 2 is a schematic side view of the present invention.

FIG. 3 is a schematic sectional view of the present invention taken from line 3—3 of FIG. 2.

FIG. 4 is a schematic sectional view of the present invention taken from line 4—4 of FIG. 3.

DESCRIPTION OF THE PREFERRED EMBODIMENT

With reference now to the drawings, and in particular to FIGS. 1 through 4 thereof, a new particulate applicator attachment for a leaf blower embodying the principles and concepts of the present invention and generally designated by the reference numeral 10 will be described.

In use, the attachment 10 is designed for attachment to a blower tube of a leaf blower for applying particulates to an area, such as a yard or garden. As best illustrated in FIGS. 1 through 4, the particulate applicator attachment for a leaf blower 10 generally comprises an elongate main tube 12 having opposite intake and discharge ends 13,14. Each of the ends of the main tube 12 has an opening into the lumen of the main tube 12. The intake end 13 of the main tube 12 is adapted for attachment to a blower tube of a leaf blower such that the lumen of the main tube 12 is in fluid communication with the blower tube. A container 15 for holding particulates is coupled to the main tube 12. Provided in the lumen of the main tube 12 are intake and outlet conduits 16,17. One end 18,19 of each of the conduits is connected to the container 15 such that the lumen of the main tube 12 is in fluid communication with the interior of the container 15 through the conduits.

In closer detail, the elongate main tube 12 is generally cylindrical and has a longitudinal axis, a lumen and opposite intake and discharge ends 13,14. Each of the ends of the main tube 12 has a generally circular opening into the lumen of the main tube 12. The intake end 13 of the main tube 12 is adapted for attachment to a blower tube of a leaf blower such that the lumen of the main tube 12 is in fluid communication with the blower tube. Ideally, the intake end 13 of the main tube 12 is designed for insertion into the nozzle end of a blower tube of a leaf blower. The intake end 13 of the main tube 12 is designed for receiving air blown out of the blower tube of a leaf blower while the discharge end 14 of the main tube 12 is designed for permitting discharge of air therefrom. In an ideal illustrative embodiment, the main tube 12 has a length of about 10 inches and a diameter of about 4 inches.

A generally disk-shaped container 15 is coupled to the main tube 12. The container has an interior for holding particulates such as powdered pesticides therein. Intake and outlet conduits 16,17 are disposed in the lumen of the main tube 12 between the ends of the main tube 12. Preferably, the intake and outlet conduits 16,17 are positioned adjacent to one another and located in a support post 26 extending across the diameter of the lumen of the main tube 12. Each conduit is preferably generally L-shaped and has a pair of open ends. One end 18,19 of each of the conduits is connected to the container 15 such that the lumen of the main tube 12 is in fluid communication with the interior of the container 15 through the conduits. As illustrated in FIG. 3, the other end 20 of the intake conduit 16 faces towards the intake end 13 of the main tube 12 such that air moving from the intake end 13 of the main tube 12 towards the discharge end 14 of the main tube 12 such that air passes through the intake conduit 16 into the interior of the container 15 so that the passing air may mix with particulates held in the interior of the container 15. The other end 21 of the outlet conduit 17 faces towards the discharge end 14 of the main tube 12 such that the mixture of moving air and particulates in the interior of the container 15 may pass into the lumen of the main tube 12 and out of the discharge end 14 of the main tube 12 to be applied to a yard or garden. Ideally, the other ends 20,21 of the conduits 16,17 are centered in the lumen of the main tube 12 along the longitudinal axis of the main tube 12.

Preferably, the main tube 12 has a secondary outlet tube 22 outwardly extending therefrom to form a secondary outlet opening 23 into the lumen of the main tube 12. The secondary outlet tube 22 is positioned between the intake end 13 of the main tube 12 and the intake conduit 16. The secondary outlet tube 22 has a longitudinal axis which is extended at an acute angle from the longitudinal axis of the main tube 12 with respect to the discharge end 14 of the main tube 12. A generally disk-shaped deflector plate 24 is provided in the lumen of the main tube 12. The deflector plate 24 permits a user to control the amount of particulate sprayed from the discharge end 14 of the main tube 12. The deflector plate 24 is positioned between the intake end 13 of the main tube 12 and the intake conduit 16. The deflector plate 24 is pivotally mounted (or rotationally mounted) to the main tube 12 to permit pivoting (or rotation) of the deflector plate 24 about an axis substantially perpendicular to the longitudinal axis of the main tube 12. The deflector plate 24 preferably has a turning knob 25 outwardly extending from the main tube 12. The turning knob 25 is designed for permitting pivoting (or rotation) of the deflector plate 24 by a user turning the knob 25. The deflector plate 24 is designed for selectively deflecting air moving from the intake end 13 of the main tube 12 to the outlet end of the main tube 12 towards the secondary outlet tube 22 so that more or less air may be channeled away from the intake conduit 16 and discharge end 14 of the main tube 12 and towards the secondary outlet opening 23.

In use, the container is filled with powdered pesticides and the intake end of the main tube is attached to the blower tube of a leaf blower. Some of the air blown into the main tube from the leaf blower passes through the intake conduit into the interior of the container to mix with the particulates of the pesticide. The air and particulate mixture then passes back into the lumen of the main tuber through the outlet conduit and out through the discharge end of the main tube. To control the amount of particulates sprayed out of the discharge end, the deflecting plate is turned to deflect more or less air towards the secondary outlet opening to decrease or increase, respectfully, the amount of air and particulate mixture discharged from the discharge end of the main tube.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An attachment for attachment to a blower tube of a leaf blower for applying particulates to an area, said attachment comprising:

an elongate main tube having a lumen and opposite intake and discharge ends;

each of said ends of said main tube having an opening into said lumen of said main tube;

said intake end of said main tube being adapted for attachment to a blower tube of a leaf blower such that said lumen of said main tube is in fluid communication with said blower tube;

a container having an interior for holding particulates, said container being coupled to said main tube;

intake and outlet conduits being disposed in said lumen of said main tube, each conduit having a pair of open ends;

one end of each of said conduits being connected to said container such that said lumen of said main tube is in fluid communication with said interior of said container through said conduits;

said main tube having a secondary outlet tube outwardly extending therefrom to form a secondary outlet opening into said lumen of said main tube; and said secondary outlet tube being positioned between said intake end of said main tube and said intake conduit.

2. The attachment of claim 1, wherein another end of said intake conduit faces towards said intake end of said main tube, and another end of said outlet conduit faces towards said discharge end of said main tube.

3. The attachment of claim 1, wherein said main tube has a longitudinal axis, wherein said secondary outlet tube having a longitudinal axis, said longitudinal axis of said secondary outlet tube being extended at an acute angle from said longitudinal axis of said main tube with respect to said discharge end of said main tube.

4. The attachment of claim 3, further comprising a deflector plate being provided in said lumen of said main tube, said deflector plate being positioned between said intake end of said main tube and said intake conduit, said deflector plate being pivotally mounted to said main tube to permit pivoting of said deflector plate about an axis substantially perpendicular to said longitudinal axis of said main tube.

5. The attachment of claim 4, wherein said deflector plate has a turning knob outwardly extending from said main tube.

6. An attachment for attachment to a blower tube of a leaf blower for applying particulates to an area, said attachment comprising:

an elongate main tube being generally cylindrical and having a longitudinal axis, a lumen and opposite intake and discharge ends;

each of said ends of said main tube having an opening into said lumen of said main tube;

said intake end of said main tube being adapted for attachment to a blower tube of a leaf blower such that said lumen of said main tube is in fluid communication with said blower tube;

a container having an interior for holding particulates, said container being coupled to said main tube;

intake and outlet conduits being disposed in said lumen of said main tube, each conduit being generally L-shaped and having a pair of open ends;

one end of each of said conduits being connected to said container such that said lumen of said main tube is in fluid communication with said interior of said container through said conduits;

another end of said intake conduit facing towards said intake end of said main tube;

another end of said outlet conduit facing towards said discharge end of said main tube;

said main tube having a secondary outlet tube outwardly extending therefrom to form a secondary outlet opening into said lumen of said main tube, said secondary outlet tube being positioned between said intake end of said main tube and said intake conduit;

said secondary outlet tube having a longitudinal axis, said longitudinal axis of said secondary outlet tube being extended at an acute angle from said longitudinal axis of said main tube with respect to said discharge end of said main tube;

a deflector plate being provided in said lumen of said main tube, said deflector plate being positioned between said intake end of said main tube and said intake conduit, said deflector plate being pivotally mounted to said main tube to permit pivoting of said deflector plate about an axis substantially perpendicular to said longitudinal axis of said main tube, said deflector plate having a turning knob outwardly extending from said main tube.

* * * * *